Patented Sept. 26, 1939

2,174,069

UNITED STATES PATENT OFFICE 2,174,069

ALKYLATED CHLORO-AROMATIC HYDROCARBON MIXTURES

Robert R. Dreisbach, Midland, Mich., assignor to The Dow Chemical Company, Midland, Mich., a corporation of Michigan No Drawing. Application April 26, 1937, Serial No. 139,022

3 Claims. (Cl. 260—650)

The present invention concerns certain new products comprising complex mixtures of alkylated cholor-aromatic hydrocarbons. The products vary in physical form from colorless liquids to brown semi-solid resins, and because of their complex nature exhibit a combination of valuable properties, e. g. low volatility, high dielectric strength, etc., not possessed by individual alkyl chloro-hydrocarbons. Certain of the new products, being substantially non-flammable and having a high electrical resistivity and low freezing point, are good dielectric agents for use alone or in admixture with other liquid dielectrics in transformers and other electrical equipment. Others of the products may be employed directly as insecticides, fumigants, etc., or may be hydrolyzed to form complex phenolic mixtures having good disinfecting properties. Those products which are semi-solids are useful as fillers and plasticizers for synthetic resins, etc.

My new products are prepared preferably by reacting a chlorinated aromatic hydrocarbon or a mixture of such chlorinated hydrocarbons with a mixture of gaseous olefins, e. g. cracked-oil gas, in the presence of a Friedel-Crafts catalyst. In practice, one part by weight of a chloro-aromatic hydrocarbon, e. g. chlorbenzene, ethylchlorbenzene, dichlorxylene, etc., or a mixture of such chloro-hydrocarbons, and between 0.02 and 0.2 part of aluminum chloride or other Friedel-Crafts catalyst are placed in a closed reactor provided with an agitator. A mixture of gaseous olefins from any desired source (e. g. a mixture of ethylene, propylene, butylene, amylene, inert gases, etc., produced by the pyrolysis of petroleum oil, and usually termed cracked-oil gas) is then passed into the reactor at a temperature between about 0° C. and about 100° C. while stirring the reaction mixture and maintaining the same under moderate pressure, e. g. up to 100 pounds per square inch gauge. If the chloro-hyrocarbon to be alkylated is a solid, the reaction is carried out in an inert solvent such as carbon disulphide. Operation in the manner just described is continued until the desired degree of alkylation is reached. Introduction of the gaseous olefin mixture is then stopped and the reaction mixture is allowed to stand for some time, e. g. 0.5 hour or longer, during which a heavy sludge settles to the bottom of the reactor and is drawn off for re-employment as a catalyst in subsequent reactions. The clear supernatant liquid is washed with water, neutralized with aqueous alkali, and dried. This dried product may be utilized as such, or it may be distilled at reduced pressure to separate the alkylated chloro-aromatic hydrocarbon product from unreacted chlorohydrocarbons and from the tarry residue formed during alkylation.

In preparing the new alkylated chloro-aromatic hydrocarbon products according to the foregoing method, a mixture of alkyl halides instead of the mixture of gaseous olefins may be used as the alkylating agent according to procedure similar to that described above. The products may also be prepared by first reacting an aromatic hydrocarbon or mixture of such hydrocarbons with a mixture of gaseous olefins in the presence of a Friedel-Crafts catalyst and then chlorinating the alkylated hydrocarbon mixture.

When a light high-boiling oil having good dielectric properties is desired, a lower chlorinated aromatic hydrocarbon is alkylated to a moderate extent only; i. e. sufficiently to obtain a product consisting largely of alkylated chlorohydrocarbons having less than five substituent groups per molecule. By more nearly complete alkylation, especially of the higher chlorinated aromatic hydrocarbons, semi-solid resinous materials are produced. In addition to an exceedingly complex mixture of alkyl chlorohydrocarbons, my new products may also contain small proportions of chlorohydrocarbons, alkylated hydrocarbons, polymerized olefins, etc., formed during alkylation.

In general, my new products boil at temperatures between about 50° C. and about 300° C. at 2 millimeters absolute pressure, congeal at a temperature between —60° and 50° C., and have a specific gravity between about 0.88 and about 1.2.

The following examples illustrate a number of ways in which the principle of the invention has been employed, but are not to be construed as limiting its scope:

Example 1

A mixture of 400 grams of technical monochlorbenzene and 60 grams of aluminum chloride was placed in a closed reactor provided with a mechanical stirrer. While maintaining the mixture at a temperature of about 15°–25° C., cracked oil gas (consisting chiefly of ethylene, propylene, butylene and inert gases) was introduced with agitation at a pressure of about 60 pounds per square inch gauge until the reaction mixture had gained 159 grams in weight. When addition of the oil gas was complete the mixture was permitted to settle and the sludge layer was removed. The remaining material was washed successively with water and aqueous alkali, and then dried. 404 grams of this dried material was distilled at atmospheric pressure until the temperature of the vapors reached 140° C.; in this way 220 grams of unreacted chlorbenzene was recovered. The residue was then distilled without fractionation at reduced pressure, whereby 90 grams of an alkylated chlorbenzene product boiling at temperatures between 100° and 280° C. at 2 millimeters pressure and having the following properties was obtained: chlorine content, 14.43 per cent by weight; congealing point, —40° C.; specific gravity, 0.988; refractive index 1.515; viscosity at 180° F., 20.5 millipoises; electrical resistivity, infinity at 50° C.

*Example 2*

A mixture of 400 grams of technical dichlorbenzene (consisting chiefly of ortho- and para-dichlorbenzenes) and 60 grams of aluminum chloride was reacted with cracked oil gas at a temperature of about 40°–50° C. according to the procedure of Example 1, until the reaction mixture had gained 62.5 grams in weight. The reaction mixture was allowed to settle and the supernatant liquid was washed with aqueous alkali and dried. 339 grams of the dried reaction product was distilled at atmospheric pressure until the temperature of the vapors reached 185° C.; in this way 238 grams of unreacted dichlorbenzene was recovered. The residue was then distilled without fractionation at reduced pressure, whereby 75 grams of an alkylated dichlorbenzene product boiling at temperatures between 50° and 280° C. at 2 millimeters pressure and having the following properties was obtained: chlorine content 28.64 per cent by weight; congealing point —55° C.; specific gravity 1.103; refractive index 1.533; viscosity at 180° F., 14 millipoises; dielectric strength 19,000 volts at 0.1 inch.

*Example 3*

A mixture of 900 pounds of technical polychlorbenzenes (consisting chiefly of tri- and tetra-chlorbenzenes) and 30 pounds of aluminum chloride was reacted with cracked oil gas at a temperature of about 25°–40° C. according to the procedure of Example 1 until the reaction mixture had gained 235 pounds in weight. The reaction mixture was allowed to settle and was washed with aqueous alkali and dried. 960 pounds of the dried reaction product was distilled at atmospheric pressure until the temperature of the vapors reached about 250° C.; in this way 770 pounds of unreacted polychlorbenzenes was recovered. The residue was a dark brown viscous semi-solid at room temperature and had the following properties: chlorine content, 3.88 per cent by weight; boiling range, 100°–275° C. at 2 millimeters pressure; congealing point, 35°–45° C.; specific gravity, 0.894 60°/25° C.; viscosity at 180° F., 7823 millipoises. In addition to alkylated polychlorobenzenes, this material contained a substantial proportion of polymerized olefins.

*Example 4*

400 grams of ethyl chlorbenzene (chlorine content 25.3 per cent by weight) and 60 grams of aluminum chloride were reacted with cracked oil gas at a temperature of about 15°–20° C. according to the procedure of Example 1 until the reaction mixture had gained 100 grams in weight. The reaction mixture was allowed to settle and the supernatant liquid was washed with aqueous alkali and dried. 362 grams of the dried product was distilled at atmospheric pressure until the temperature of the vapors reached 190° C.; in this way 183 grams of unreacted ethyl chlorbenzene was recovered. The residue was then distilled without fractionation at reduced pressure, whereby 112 grams of alkylated ethyl chlorbenzenes boiling at temperatures between 75° C. at 6 millimeters pressure and 270° C. at 2 millimeters pressure and having the following properties was obtained: chlorine content, 16.69 per cent by weight; congealing point —48° C.; specific gravity, 1.00; refractive index 1.521; viscosity at 180° F., 16.1 millipoises.

The term "mixture of gaseous olefins" as herein employed refers to any gaseous mixture comprising a substantial proportion of gaseous olefins, but which may also contain inert gases, etc.

Other modes of applying the principle of the invention may be employed, change being made as regards the details herein disclosed, provided the products stated by any of the following claims, or the equivalent of such stated products be employed.

I therefore particularly point out and distinctly claim as my invention:

1. The product obtainable by reacting in the presence of a Friedel-Crafts catalyst at least one chlorinated aromatic hydrocarbon of the benzene series having not more than 4 chlorine atoms attached to the benzene nucleus with a complex mixture of gaseous olefins obtainable by cracking a petroleum oil fraction.

2. The product obtainable by reacting monochlorbenzene in the presence of a Friedel-Crafts catalyst with a complex mixture of gaseous olefins obtainable by cracking a petroleum oil fraction, said product boiling at temperatures between 100° C. and 280° C. at 2 millimeters absolute pressure, congealing at about —40° C., and having a specific gravity of about 0.99.

3. The product obtainable by reacting a mixture of dichlorbenzenes in the presence of a Friedel-Crafts catalyst with a complex mixture of gaseous olefins obtainable by cracking a petroleum oil fraction, said product boiling at temperatures between 50° C. and 280° C. at 2 millimeters pressure, congealing at about —55° C., and having a specific gravity of about 1.11.

ROBERT R. DREISBACH.